United States Patent [19]

Fetter

[11] Patent Number: 4,788,934
[45] Date of Patent: Dec. 6, 1988

[54] PET DOMICILE

[76] Inventor: Jon A. Fetter, 837 Wesson Ct., Casselberry, Fla. 32707

[21] Appl. No.: 65,405

[22] Filed: Jun. 23, 1987

[51] Int. Cl.$^4$ .................. A01K 45/00; A01K 1/02
[52] U.S. Cl. .................................... 119/1; 119/19
[58] Field of Search .................. 119/1, 15, 16, 19

[56] References Cited

U.S. PATENT DOCUMENTS 2,712,677  7/1955  Hyde .................................... 119/16
2,795,208  6/1957  Rasmussen ............................ 119/15
4,347,502  8/1982  Holmes et al. ...................... 119/1 X Primary Examiner—Robert Peshock
Attorney, Agent, or Firm—Macdonald J. Wiggins

[57] ABSTRACT

A pet domicile is mounted exterior to a house adjacent an exterior door of the house, the door having a pet operated pet door therethrough. A flexible tunnel connects the pet door to an entrance opening of the pet domicile, permitting the pet to access the domicile from the house and the flexible tunnel permitting normal outward opening of the exterior door of the house.

14 Claims, 1 Drawing Sheet

PET DOMICILE

BACKGROUND OF THE INVENTION

1. Field of the Invention

The present invention relates to pet domiciles, and more particularly to a domicile for a garage or carport from which the pet can enter from the house.

2. Description of the Prior Art

Many pet owners permit their pet to have the run of the house, but prefer that the pet eat and sleep out of the house to minimize odors and unsanitary conditions. This is especially true of cats since it is common to have a litter box in the house. It is, of course, well known to provide dog houses and the like in the yard; however, this approach poses problems in bad weather and a requirement for fences or leashes to prevent pets from running free. Thus, there is a need for a pet domicile which is outside of the living area of a house, yet which can provide the pet access without leaving the house.

This problem was approached by Calkins in U.S. Pat. No. 4,021,975. This patent discloses a domicile outside of a house and fastened to an exterior wall thereof. A tunnel is provided through the wall having a barrier through which the pet can pass. Although effective for the purpose, the Calkins pet domicile requires relatively expensive construction since it must be weatherproof and also requires an opening to be cut through the wall of a house to which it is attached. Another exterior pet shelter has been disclosed by Cruchelow et al, U.S. Pat. No. 4,291,645 who teach a structure exterior to a house having a basement. The structure is attached directly to the house wall over a basement window. The Cruchelow shelter is relatively expensive and is only suitable for houses with basements in which a window opens to the outside. Further, it eliminates light and air to the basement via the window. Ford, in U.S. Pat. No. 1,552,288 teaches a poultry house having an enclosed screen covered run attached thereto with one feature of the house being that it is turntable mounted so it can be oriented with the sun.

SUMMARY OF THE INVENTION

The present invention is a pet domicile design specifically for mounting in a carport or a garage having a door opening into the house directly therefrom. Generally, such arrangements are present in ranch-style houses built on concrete slabs. The door to the carport or garage generally opens from a utility room, mud room, or kitchen. It is known to place a small pet door through an entrance door near the sill through which the pet may pass without assistance. The invention is used with such a pet door.

The invention includes a housing structure which may be in the form of a rectangular box and having one or two sides open. The remaining sides may be covered; for example, the bottom surface may be wood, pressed board or the like, and the remaining surfaces covered with an open material such as nylon or aluminum screening, chicken wire, or the like. It is preferable that the top surface be hinged to permit access to the structure for cleaning, filling food dishes, and the like.

The housing structure is placed one against the exterior wall of the garage or carport immediately adjacent the hinged edge of the exterior door to the dwelling with the open end of the enclosure at right angles to and adjacent the exterior door. A flexible screening, such as nylon screening, is attached to the open end of the enclosure and secured along the three edges not adjacent to the exterior wall. The screening is also attached to the exterior door to enclose the pet door. The flexible screening thereby forms a flexible tunnel through which the pet can pass from the house via the pet door into the enclosure. Although flexible screening is preferred, a tunnel may be formed from an accordian-style flexible tubing such as is available for air ducts and the like.

When it is desired to open the exterior door outward for egress and ingress to the dwelling, the flexible tunnel will fold between the door and the end of the enclosure. Therefore, a person can enter or exit the dwelling without interference of the tunnel or the pet enclosure.

As will now be recognized, a pet domicile suitable for use in a garage or carport has been disclosed which will provide access for the pet from the house to the domicile or to the house from the domicile without the necessity of cutting an opening through the wall of the house. If, at a later date, it is desirable to remove the pet domicile, the door can be economically replaced with no structural repairs to the house required.

It is therefore a principal object of the invention to provide a pet domicile which can be placed in a garage or carport and which can be accessed by the pet through a pet door in an exterior door of the house.

It is another object of the invention to prevent a pet domicile which can be accessed by the pet without extensive structural modifications to the house.

It is still another object of the invention to provide a pet domicile which can be accessed by the pet from the house which can be constructed at low cost and which will minimize odors and other nuisances in the hosue due to the pet.

These and other objects and advantages of the invention will become apparent from the following detailed description when read in conjunction with the drawings.

DETAILED DESCRIPTION OF THE PREFERRED EMBODIMENT

Figure 1:
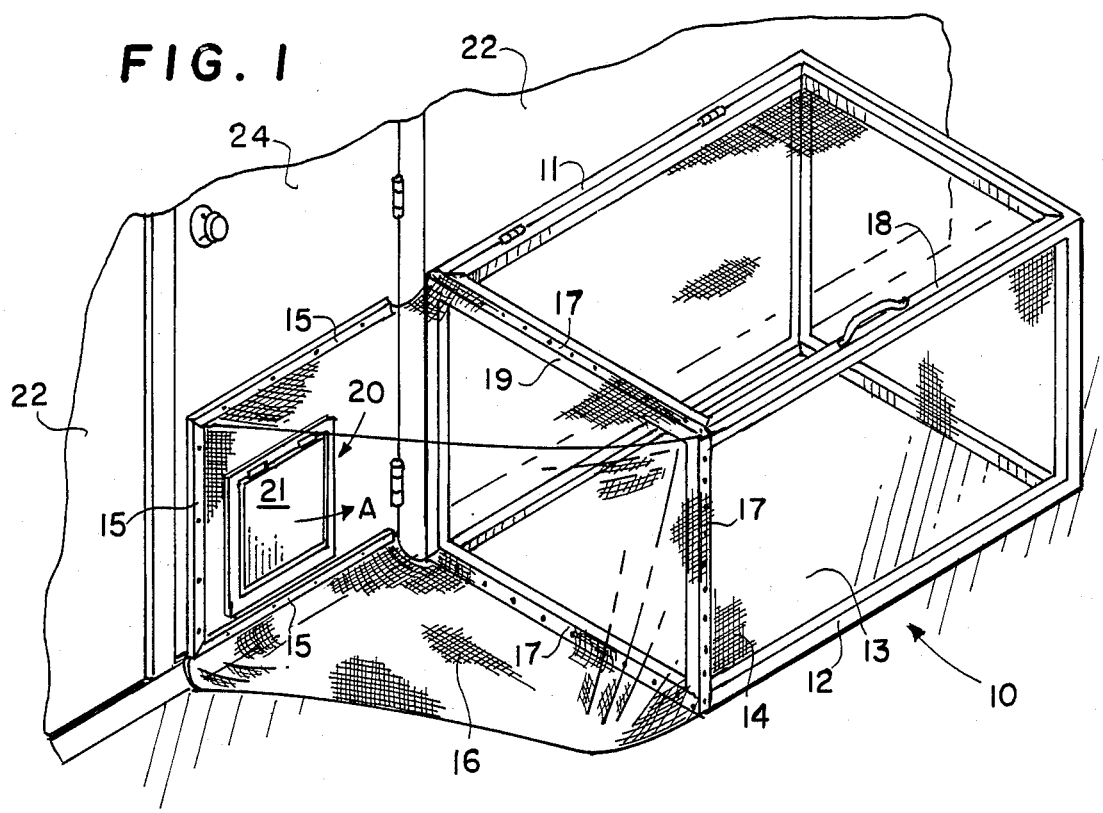
FIG. 1 is a perspective view of a preferred embodiment of the invention shown installed in a garage or carport.

FIG. 1 shows a perspective view of the preferred embodiment of the pet domicile of the invention. An enclosure shown generally at 10 is rectangular in shape, although it may be of any other desired configuration. In the preferred embodiment, enclosure 10 is formed with a framework 12 which may be formed from wood, metal or other suitable material. The rear frame portion 11 is disposed flush against exterior wall 22 of the house with which the invention is to be used and may be attached thereto if desired. Thus, frame portion 11 may be left uncovered if desired and closed by the exterior wall 22. End frame 19 is disposed at right angles to exterior door 24 and is uncovered. Floor 13 of enclosure 10 may be a sheet of suitable material such as plywood, pressed board, or alternatively, may be left open and the floor of the garage or carport may be utilized as a floor. The remaining sides of the enclosure are preferably covered with screening 14 to provide ventilation to the enclosure 10. Other material such as chicken wire, hardware cloth, and perforated hardboard are also suitable. The top surface of framework 12 is fitted with a door 18 which is hinged to frame portion 11 and covered with screening or the like. Door 18 may therefore be opened for access to the interior of enclosure 10 for cleaning, placing food dishes, litter boxes, and the like.

Exterior door 24 is provided with a pet door shown generally at 20 having a swinging door 21 which will swing outward as shown by arrow A or inward to permit the pet to leave the house or enter the house without the owner's participation. Such pet doors are well known in the art. A flexible tunnel 16 is provided from pet door 20 into enclosure 10. Although various flexible tunnel designs are suitable, a nylon screening tunnel is preferable for low cost and ease of repair or replacement if necessary. Tunnel 16 may be formed from a single piece of nylon screening which is fastened along the edges of end frame 19 by cleats 17. With the door 24 closed, the screening is stretched and fastened to the exterior surface of door 24 by cleats 15 enclosing pet door 20. Alternatively, snap fasteners may be used to permit ease of removal of the domicile. Tunnel 16 therefore permits the pet to exit the house without swinging door 21 into tunnel 16, thence into enclosure 10 for use of a litter box or for meals. The pet bed may also be housed in enclosure 10. When the pet desires to reenter the house, it may then do so via swinging door 21 without intervention of the pet owner. As will be recognized, tunnel 16 prevents the pet from escaping into the garage or carport.

Figure 2:
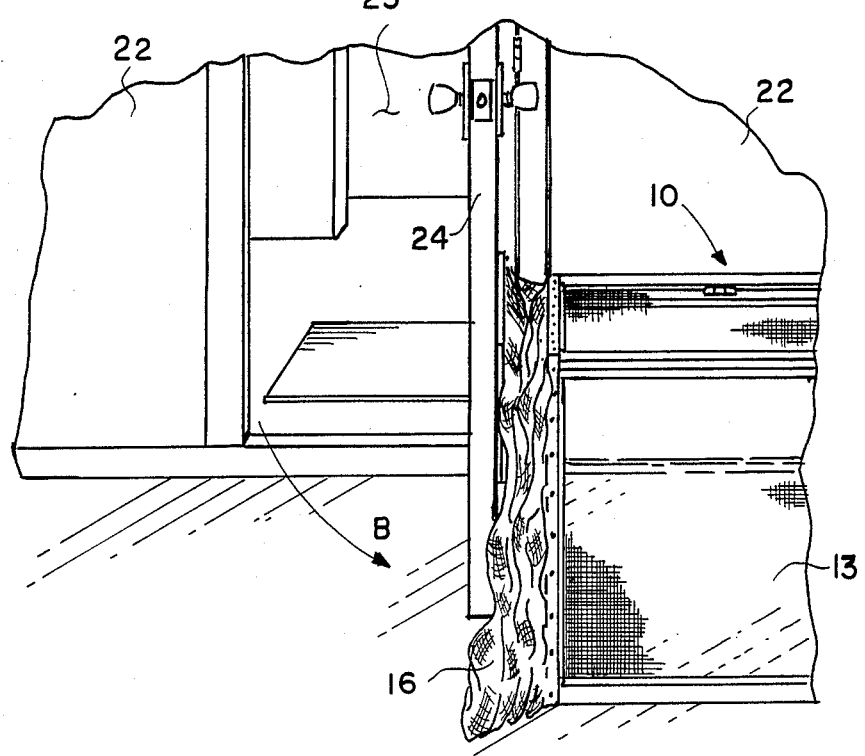
FIG. 2 is a perspective drawing showing an exterior door of the house in the open position.

Turning now to FIG. 2, a perspective view of the pet enclosure of FIG. 1 is shown with exterior door 24 opened. When a person desires to enter or exit room 25 of the house, the door is opened in normal fashion and due to the flexibility of tunnel 16, the screening is collapsed between enclosure 10 and the exterior of door 24 when door 24 is swung open as indicated by arrow B.

As will now be recognized, a novel pet domicile has been disclosed which is suitable for installation in a garage or carport adjacent an exterior door of the house and which will permit a pet to access the domicile via a pet door in the exterior door, and in which the domicile will not interfere with the normal use of the door by occupants of the house.

Although a specific embodiment of the invention has been shown, this is for exemplary purposes only and various modifications to the construction thereof may be made without departing from the spirit and scope of the invention.

I claim:

1. In a house having an outwardly opening exterior door, said door having a pet-operated pet door disposed therethrough, an exteriorly disposed pet domicile comprising:
   a rectangular enclosure having a first side thereof open to form an entrance thereto, said enclosure disposed along an exterior wall of said house adjacent a hinged edge of said exterior door;
   a flexible tunnel having a first end attached to said entrance, and a second end attached to said pet door, said tunnel permitting a pet to access said enclosure from said house, and permitting said exterior door to open outward from said house without interference.

2. The pet domicile as recited in claim 1 in which said enclosure includes a hinged door thereof to permit manual opening of the enclosure.

3. The pet domicile as recited in claim 1 in which said enclosure includes walls thereof of a ventilated material.

4. The pet domicile as recited in claim 3 in which said ventilated material is screening.

5. The pet domicile as recited in claim 1 in which said flexible tunnel is formed from nylon screening.

6. The pet domicile as recited in claim 1 in which one wall of said enclosure is formed by an exterior wall of said house.

7. A pet domicile for mounting exterior to a house in which a pet can enter or exit said domicile from said house without human intervention comprising:
   an enclosure having an entrance opening, said enclosure disposed adjacent an outward opening exterior door of said house;
   a pet-operated door disposed in said exterior door;
   a flexible tunnel connected from said pet door to said extrance opening of said enclosure, said flexible tunnel permitting normal outward opening of said exterior door.

8. The pet domicile as recited in claim 7 in which said flexible tunnel is formed from nylon screening material.

9. The pet domicile as recited in claim 7 in which said entrance opening is adjacent a hinged edge of said exterior door.

10. The pet domicile as recited in claim 1 in which said enclosure is disposed within a garage.

11. The pet domicile as recited in claim 1 in which said enclosure is disposed within a carport.

12. A pet domicile for mounting exterior to a house in which a pet can enter or exit said domicile without human intervention comprising:
   a rectangular enclosure having a first wall thereof against an exterior wall of said house, and an entrance opening at right angles to said house wall and adjacent a hinge edge of an exterior outward opening door of said house;
   a pet-operated pet door disposed through said exterior door; and
   a flexible tunnel formed from nylon screening having a first end attached to said exterior door around and communicating with said pet door, and a second end attached to and communicating with said entrance opening;
   whereby a pet has access to and from said enclsure with respect to said house, and said exterior door can be opened outwardly without interference from said tunnel and said enclosure.

13. In a house having an outwardly opening exterior door, a pet domicile disposed outside of said house adjacent said exterior door comprising:
   a pet-operated door through said exterior door;
   an enclosure having a side wall thereof open to form an entrance thereto; and
   means for connecting said entrance to said pet-operated door to permit a pet to pass between said house and said enclosure, said means including means for permitting said exterior door to open outward without interference.

14. A pet domicile for mounting exterior to a house in which a pet can enter or exit from said house without human intervention comprising:
   an outwardly opening exterior door of said house;
   a pet-operated door disposed in said exterior door;
   a six sided rectangular enclosure having a framework covered on five sides thereof and an open sixth side, said sixth side adjacent to said exterior door;
   a tunnel formed of a flexible fabric having a first end attached around said open sixth side and a second end attached around said pet-operated door, said tunnel permitting a pet to pass through said pet door into said enclosure, and permitting said exterior door to be opened outwardly without interference.

* * * * *